United States Patent
Stephens et al.

(10) Patent No.: US 7,492,728 B1
(45) Date of Patent: Feb. 17, 2009

(54) CALL HANDLING IN A PACKET VOICE NETWORK

(75) Inventors: Gary Stephens, Richardson, TX (US); Steve Craycraft, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1076 days.

(21) Appl. No.: 10/666,078

(22) Filed: Sep. 18, 2003

Related U.S. Application Data

(63) Continuation-in-part of application No. 10/623,335, filed on Jul. 17, 2003, now abandoned.

(51) Int. Cl.
*H04L 12/16* (2006.01)
*H04Q 11/00* (2006.01)

(52) U.S. Cl. .............. 370/260; 370/266; 455/416; 455/436

(58) Field of Classification Search ......... 370/259–261, 370/263–267, 270, 352–357, 400–402; 379/202.01, 379/205.01, 207.01, 215.01; 455/416, 436, 455/439, 442
See application file for complete search history.

(56) References Cited

U.S. PATENT DOCUMENTS

| | | | |
|---|---|---|---|
| 6,816,469 B1 * | 11/2004 | Kung et al. | 370/260 |
| 7,092,493 B2 * | 8/2006 | Hou et al. | 379/35 |
| 2003/0179747 A1 * | 9/2003 | Pyke et al. | 370/389 |

* cited by examiner

*Primary Examiner*—Binh K Tieu
(74) *Attorney, Agent, or Firm*—Haynes and Boone, LLP

(57) ABSTRACT

An improved system and method is disclosed for call handling in a packet network such as a CDMA, UMTS, GSM, and other networks similarly configured. The system may include an anchor media gateway that remains in a communication path even if the call has been handed off to another media gateway. The anchor media gateway includes first and second ports for establishing first and second links to transfer packet communications to and from the first and second entities, respectively. First and second packet connections are provided for interconnecting the first and second links, respectively, to an audio server. A third link connected to the audio server and is provided for transferring packet communications to and from the third entity. The audio server manipulates the packet communications received from the first, second, and third entities and provides the manipulated packet communications to the first, second, and third entities. The manipulation performed by the audio server can be combining the packet communications to provide an n-way call (e.g., a three-way call).

23 Claims, 3 Drawing Sheets

CALL HANDLING IN A PACKET VOICE NETWORK

The present patent is a continuation-in-part of U.S. Ser. No. 10/623,335, filed on Jul. 17, 2003, assigned to the same assignee as the present patent and hereby incorporated by reference.

BACKGROUND

The invention relates in general to wireless networks, and in particular to a method and system for handling different call scenarios in packet/voice networks.

Wireless communication networks provide the ability for one or more wireless or mobile nodes (generically "mobile units") to communicate with other mobile units or other nodes connected to wireless and/or wired networks. There are generally two types of wireless communication networks: circuit-switched and packet-switched.

Circuit-switched wireless communication networks typically include one or more Mobile Switching Centers (MSCs) for connecting to other switching centers and other networks, including the landline Public Switched Telephone Network (PSTN). Typical call control protocols in a circuit-switched network include ISUP (ISDN User Part) and Feature Group D.

Packet-switched wireless communication networks typically include a plurality of call servers and Media Gateways (MGs). SIP (Session Initiation Protocol) and BICC (Bearer Independent Call Control) are examples of call control protocols used in a packet-switched network.

The current approach to introducing packet based (e.g. Internet Protocol) multimedia services for wireless communication networks such as Universal Mobile Telecommunications Service (UMTS), Global System for Mobile Communications (GSM) and Code Division Multiple Access (CDMA) is to define an IP Multimedia Subsystem (IMS). IMS includes a plurality of IP-connected network entities using packet-switched services. These network entities provide IP Multimedia features and services using such vehicles as Session Initiation Protocol (SIP) for call control.

The IMS shares little in common with the traditional MSC supporting circuit-switched services. Also, the IMS introduces design difficulties that are new and or different from those in circuit-switched services. For example, when a mobile unit goes through handoff in a packet based network, a dynamic packet trunk (DPT) serving the call may not be able to be re-routed during the call. It is desired to reduce associated difficulties and support various call-handling scenarios in the packet network and other networks similarly configured.

SUMMARY

An improved system and method is disclosed for handling calls in a packet network and other networks similarly configured. In one embodiment, a system is provided for handling packet communications from three entities in a packet communications network. The system comprises first and second ports for establishing first and second links to transfer packet communications to and from the first and second entities, respectively. First and second packet connections are provided for interconnecting the first and second links, respectively, to an audio server. A third link connected to the audio server and is provided for transferring packet communications to and from the third entity. The audio server manipulates the packet communications received from the first, second, and third entities and provides the manipulated packet communications to the first, second, and third entities. The manipulation performed by the audio server can be combining the packet communications to provide an n-way call (e.g., a three-way call). Alternatively or in addition, the manipulation performed by the audio server is selectively routing the packet communications to provide a call-waiting service.

In another embodiment, a media gateway is provided, including first and second call ports for transmitting and receiving packet call information, a processor for performing instructions in response to call-handling control information, and a memory for storing a plurality of instructions. The instructions are for routing packet call information from the first and second call ports to an audio server upon receipt of three-way call control information, and for directing the audio server to combine the packet call information from the first and second call ports with call information from a third entity.

In another embodiment, an anchor media gateway is provided. The anchor media gateway includes a control interface for receiving control information, first and second call ports for transmitting and receiving packet call information from first and second media gateways, respectively, a processor for performing instructions in response to received control information, and a memory for storing a plurality of instructions. The instructions are for routing packet call information between the first and second call ports and, upon receipt of control information, for routing the packet call information to an audio server. The audio server can be further connected to a third media gateway for transmitting and receiving packet call information there from. The instructions are also for modifying at least a subset of the packet call information received by the audio server and routing the modified subset of the packet call information to the second media gateway, upon receipt of the control information.

In another embodiment, a method is provided for handling a request for a three-way call in a packet communications network. The method can be performed, for example, by a call server used for controlling an anchor media gateway. The method includes instructing the anchor media gateway to route voice packets between first and second ports connected to first and second media gateways, respectively. Upon receipt of the request for the three-way call, the anchor media gateway is instructed to route the voice packets to an audio server, which is instructed to combine the voice packets with voice packets from a third media gateway. The anchor media gateway is further instructed to route the combined voice packets to the first and second ports. In some embodiments, the method also instructs the anchor media gateway to perform a hard handoff to the second port connected to the second media gateway.

In yet another embodiment, a method is provided for handling a request for call-waiting in a packet communications network. The method includes instructing an anchor media gateway to route voice packets between a first port and a second port connected to a first media gateway and a second media gateway, respectively. Upon receipt of the request for call-waiting, the anchor media gateway is instructed to route voice packets between the first port and a third port connected to a third media gateway. In some embodiments, the method also instructs the anchor media gateway to perform a hard handoff to the second port connected to the second media gateway.

The present invention can be implemented in many different types of networks, including but not limited to, UMTS, GSM and CDMA type packet networks.

DETAILED DESCRIPTION

Various aspects of the following disclosure provide a unique method and system for improved packet voice transmission in a cellular wireless communication environment. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
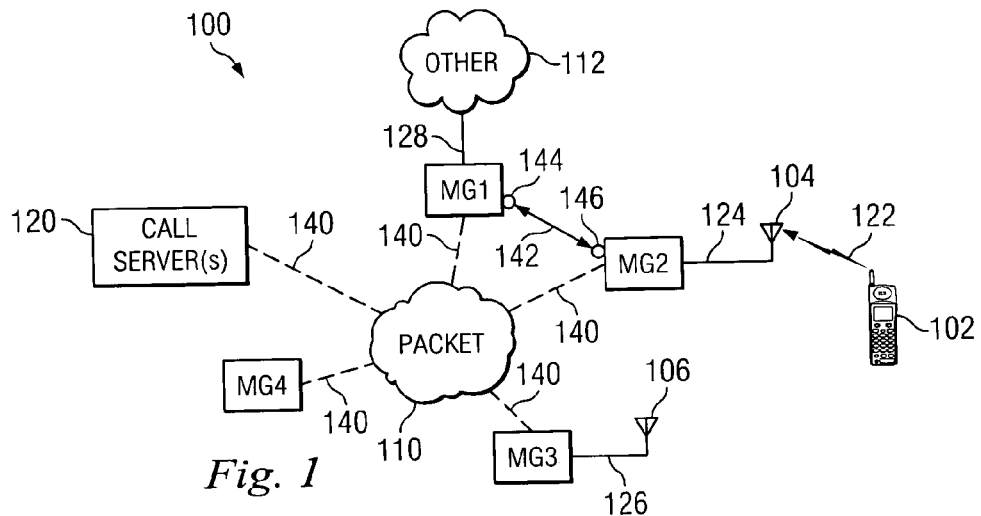
FIGS. 1, 4 and 5 are examples of a network incorporating one embodiment of the present invention.

Referring to FIG. 1, in the present embodiment, communication system 100 is a Third Generation (3G) wireless system. Communication system 100 can alternately be any digital or analog cellular system that provides services such as packet voice or voice-over-IP (VoIP). 3G wireless systems include multiple air interface standards, including cdma2000, Universal Mobile Telecommunications System (UMTS), Wideband CDMA (W-CDMA), Global System for Mobile Communications (GSM), and UWC-136, a TDMA-based technology.

FIG. 1 depicts nodes and links that have been defined based on network functions that will be discussed in greater detail below. Actual implementations may contain multiple copies of these nodes within multiple networks, may merge any of these nodes into single hardware entities, or may distribute portions of the nodes among several hardware entities. The architecture of the present embodiments is designed to utilize emerging Internet standards and protocols. An example of this is the use of Session Initiation Protocol (SIP) for IMS signaling for establishing a call. Use of emerging internet-based protocols allows for the IMS to provide internet-like functionality and services to mobile units along with voice and data services.

Communication system 100 comprises a plurality of nodes, including a mobile unit 102, Radio Access Networks (RANs) 104, 106, a packet-switched domain 110, another domain such as a circuit-switched domain 112, a plurality of Media Gateways MG1, MG2, MG3, MG4 and a call server 120. Each node can be selectively connected to one or more of the other nodes either directly through a physical or wireless connection, or through a plurality of intermediate nodes. The nodes and the plurality of intermediate nodes may serve to modify the connection as required, such as converting information between different packet, circuit, and/or wireless protocols.

Mobile unit 102 can be any device or combination of devices that can be used to connect with a wireless network. For example, the mobile unit 102 can be comprised of terminal equipment and a 3G mobile unit that communicates with communication system 100 via an air interface.

RANs 104, 106 provide an interface between the mobile unit 102 and the packet-switched domain 110. For example, RANs 104, 106 may be an IMT-2000 radio interface for a CDMA access network. Other examples include a UMTS Terrestrial Radio Access Network (UTRAN) for a UMTS access network or a GSM/EDGE Radio Access Network (GERAN) for a GSM/EDGE access network. In the present embodiment, RANs 104, 106 are selectively coupled to the mobile unit 102 via a wireless link, such as a 3G air interface. In FIG. 1, the RAN 104 is coupled to the mobile unit 102 via a first wireless link 122.

Packet-switched domain 110 is a network that may support many different types of packet-based communications, including VoIP. In one example, the packet-switched domain 110 may include a plurality of CDMA nodes such as Packet Data Service Nodes (PDSNs), Mobile IP Foreign Agents (FAs), Mobile IP Home Agents (HAs), and Authentication, Authorization and Accounting (AAA) Servers. In another example, the packet-switched domain 110 may include a plurality of GSM nodes such as Serving GPRS Support Nodes (SGSNs) and Gateway Support Nodes (GGSNs). Additional or alternative nodes may be used to provide packet-switched service, as required by the type of packet-switched domain being used.

Circuit-switched domain 112 is a network that may support many different types of circuit-based communications, including voice. In one example, the circuit-switched domain 112 may include a plurality of mobile switching center (MSC) servers and a plurality of gateway servers. The circuit-switched domain 112 may include the Public Switched Telephone Network (PSTN).

Media gateways MG1, MG2, MG3, and MG4 may share some or all of the features, or may be adapted to handle different requirements from supported domains, RANs, and so-forth. Media gateway MG2 supports inter-working of media flows to and from the RAN 104 through a communications link 124. Likewise, media gateway MG3 supports inter-working of media flows to and from the RAN 106 through a communications link 126. Media gateway MG1 is illustrated as interfacing with the circuit-switched domain 112 through a link 128. In the present embodiment, the media gateway MG1 is a conventional gateway device and operates according to conventional operational modes. It is understood, however, that in other embodiments, the media gateway MG1 can be modified as suggested herein. Media flows for the media gateways MG1, MG2, MG3 and MG4 may use various transport and codec options, as are well known in the art.

Figure 2:
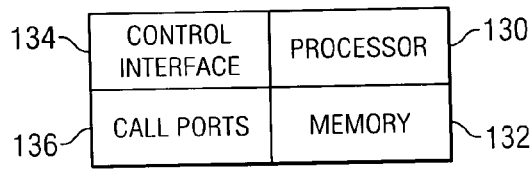
FIG. 2 is a block diagram of a media gateway used in the networks of FIGS. 1 and 4-9.

Referring to FIG. 2, the media gateways MG1, MG2, MG3 and MG4 may include a plurality of components. For the sake of example, media gateway MG2 will be considered in further detail. The media gateway MG2 includes one or more processors 130 connected to a plurality of memory devices 132. The processor(s) 130 can perform general processing operations as well as process the voice signals for "interconnecting" communication paths between two or more of the various ports. The memory devices 132 may include various combinations of hard drive, random access memory, read-only memory, and removable diskettes. The memory devices 132 can by used for receiving and storing instructions for performing various tasks, including those of the present embodiments. The media gateway MG2 may also include a control interface 134 for receiving control instructions from other nodes in the network. In the present embodiment, the control instructions are formatted according to H.248 protocol. It is understood that H.248 protocol is only one example of a method for sending and receiving control instructions. Other examples include H.323 protocol and SIP protocol. The media gateway MG2 may also include a plurality of ports 136. The ports are for connecting to various nodes in the network, including the other media gateways in the communications network 100 and the associated RANs (if any). It is understood that for different embodiments, different and/or additional components can be used. For example, when one of the RANs is connected to a circuit-switched network, the corresponding node may include a switching fabric as is well known in the art.

Referring again to FIG. 1, the call server 120 communicates with one or more of the media gateways via a control interface 140, which in the present example uses H.248 protocol. In one embodiment, the call server is a DMS-MTX provided by Nortel Networks of Ontario, Canada. Other embodiments may readily use call servers from other manufactures as well. In the present embodiment, the call server 120 supervises and controls voice/data path connections to the domains 110, 112 and other mobility switches.

Figure 3:
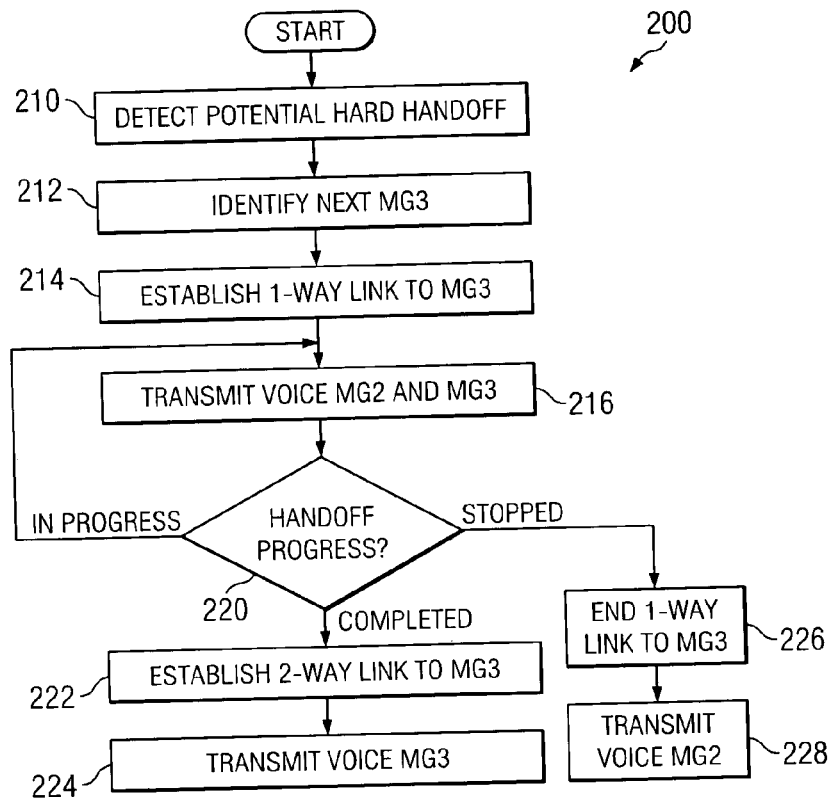
FIG. 3 is a flowchart illustrating in detail a process of one aspect of the present invention.

Referring to FIG. 3, an improved hard handoff routine 200 can be used in a communications network to support the hard handoff of the mobile unit from a first radio resource to a second radio resource. Referring also to FIG. 1, for the sake of example, the communications network 100 shows a call in progress from a first terminal unit (not shown) connected to the media gateway MG1 through the circuit-switched domain 112. In the present example, it does not matter if the first terminal unit is a landline telephone, a wireless telephone, a computer, or some other network node. A typical packet link 142 (e.g., a two-way voice communication path) is established from a port 144 on the media gateway MG1 to a port 146 on the media gateway MG2. Also in the example, the two-way link 142 is a dynamic packet trunk (DPT) that supports bearer voice, and multiple call servers are utilized. For example, one call server can control media gateway MG1 and another call server can control media gateways MG2, MG3 and MG4

Execution of the routine 200 begins at step 210 where a potential hard handoff is detected. A handoff occurs when a mobile unit transfers links from one radio resource to another. A hard handoff is a handoff in which there is a gap in supplying content to the mobile unit, such as a "break-before-make" type scenario. It is understood that there are many intermediate steps to detecting a hard handoff from an existing radio resource to a target radio resource. In continuance of the example of FIG. 1, a potential hard handoff is likely to occur from the RAN 104 to the RAN 106.

At step 212, the media gateway associated with the target radio resource is identified. In the present example, the target RAN is RAN 106 of FIG. 1 and media gateway MG3 is identified as the gateway communicating with RAN 106.

Figure 4:
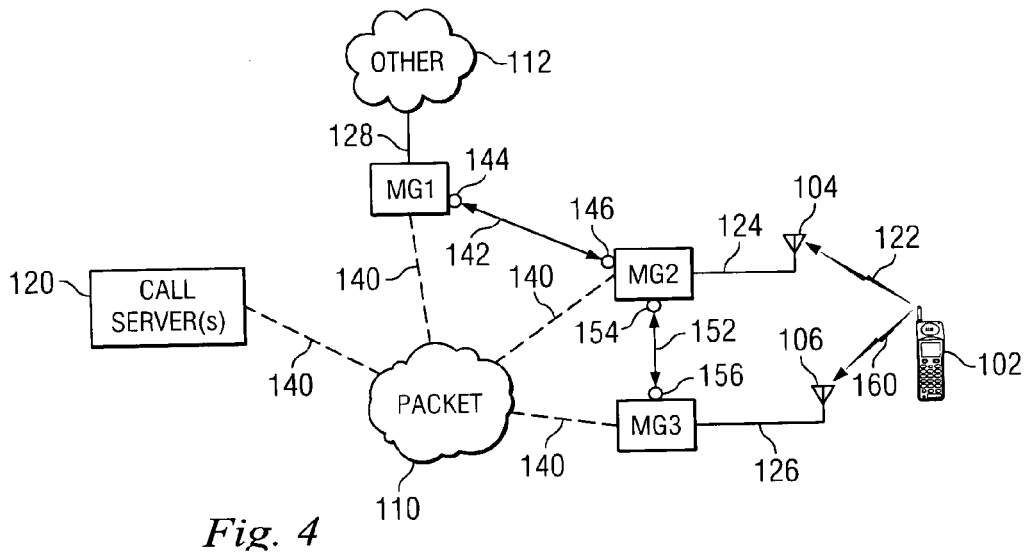

At step 214, a link is established between the media gateway serving the existing radio resource and the media gateway serving the target radio resource. Referring to FIG. 4, in continuance of the present example, a temporary link 152 (e.g., a one-way voice communication path from media gateway MG2 to media gateway MG3) is established from a port 154 on the media gateway MG2 to a port 156 on the media gateway MG3. Also in the example, the one-way link 152 is directly connected between media gateways MG2 and MG3, while in other examples, the link 152 may be connected to one or more intermediate nodes in the packet-switched domain 110.

At step 216, communications are passed by both media gateways to their respective radio resources, and towards the mobile unit, referred to generally as "bi-cast." In the present example of FIG. 4, media gateway MG2 sends and receives voice communications (based on VoIP) to the RAN 104, which sends and receives the voice communications to and from the mobile unit 102 via the first wireless link 122. At the same time, media gateway MG3 sends the same voice communications to the RAN 106, which sends the voice communications to the mobile unit 102 via a second wireless link 160. In the present example, the RAN 106 is only providing one-way communications to the mobile unit 102, but it is contemplated that a two-way communication can also be established.

Figure 5:
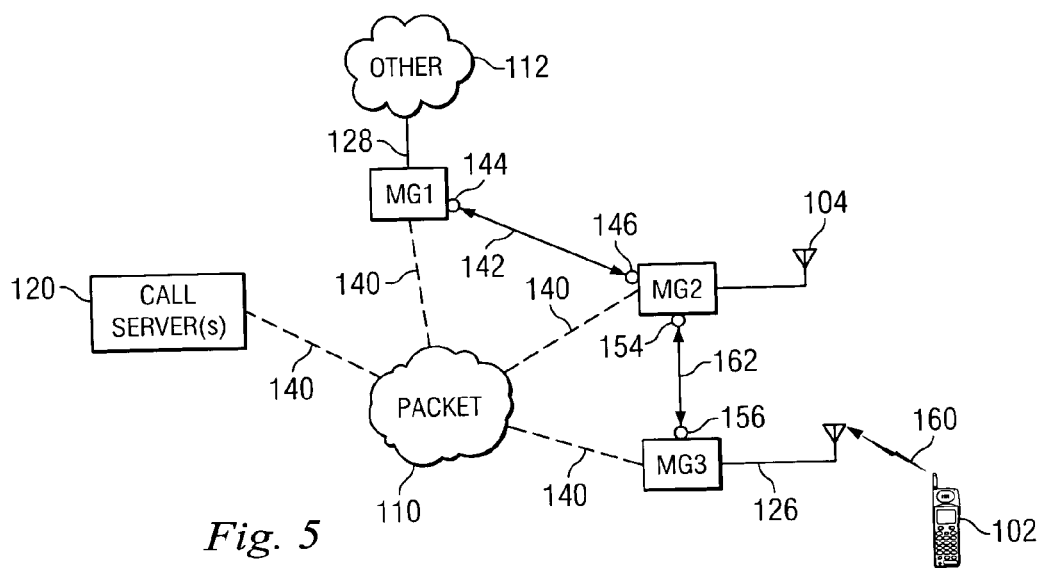

At step 220, a determination is made as to the progress of the hard handoff. If it is still in progress, execution returns to step 216 where both radio resources are transmitting communications. If the handoff has completed, execution proceeds to step 222 where a conventional link is established between the caller and the target media gateway (now referred to as the new media gateway). Referring to FIG. 5, in continuance of the present example, a typical packet link 162 (e.g., a two-way voice communication path) is established from the port 154 on the media gateway MG2 to the port 156 on the new media gateway MG3. In other embodiments, if the temporary link 152 is sufficient, it can continue to be used as the conventional link 162.

In the present embodiment, the media gateway MG2 remains in the communication path between media gateways MG1 and MG3. In this way, the media gateway MG2 can be called an "anchor" media gateway. As a result, the link 142 is maintained between the media gateways MG1 and MG2, even though the call has been handed off to media gateway MG3.

At step 224, communications are passed by the new media gateway to its respective radio resource, and towards the mobile unit. In the present example of FIG. 5, media gateway MG3 sends and receives voice communications (based on VoIP) to the RAN 106, which sends the voice communications to the mobile unit 102 via the wireless link 160.

If at step 220 it is determined that the handoff has been aborted, execution proceeds to step 226. In the present example, there are many reasons to abort a handoff, such as the mobile unit powers down or the mobile unit moves away from an area served by the RAN 106. At step 228, communications are passed by the prior media gateway to its respective radio resource, and towards the mobile unit. In this case, the scenario returns to as it was in FIG. 1 where media gateway MG2 sends and receives voice communications to the RAN 104, which sends the voice communications to the mobile unit 102 via the wireless link 122.

Figure 6:
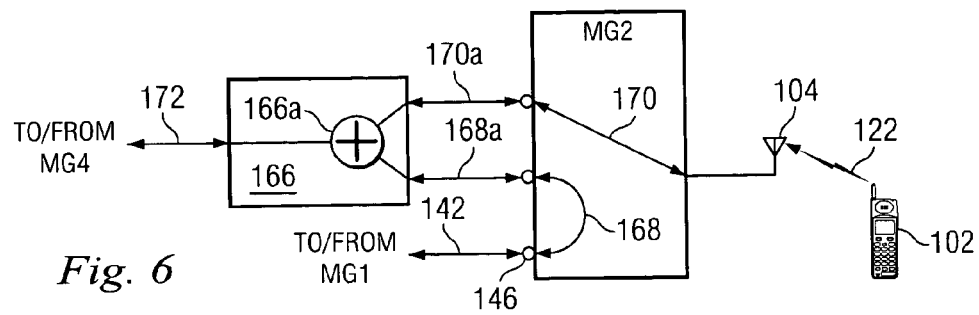
FIGS. 6-9 are examples of a media gateway and associated components performing different embodiments and features of the present invention.

Referring now to FIG. 6, the media gateway MG2 can provide additional call handling features. For example, the mobile unit 102 can be in communication with an entity connected through media gateway MG1, and it is desired to set up a three-way call with another entity connected to media gateway MG4. Instructions for establishing the three-way call can be provided by the appropriate call server 120, directly from the media gateway MG2, or from another node in the network. For example, the mobile unit 102 can send a signal to the media gateway MG2 to establish a three-way call, and the media gateway MG2 can respond to the signal accordingly.

In this example, packet traffic from port 146 is directed to an audio server 166 through packet connection 168. Likewise, packet traffic from the RAN 104 is directed to the audio server 166 through packet connection 170. It is understood that the reference to packet connections is not intended to designate a particular pathway or bus, although such an implementation is possible. In some embodiments, the processor 130 (FIG. 2) can route information to specific ports and internal or external nodes as required using one or more pathways or buses.

In one embodiment, the audio server 166 is a node that is separated from the media gateway MG2. For this embodiment, the packet connections 168, 170 include external connections 168a, 170a, respectively between the media gateway MG2 and the audio server 166. The audio server 166 is also connected to the media gateway MG4 through packet connection 172. It is understood that the packet connections 168a, 170a, and/or 172 may be part of a single, common transmission medium. In other embodiments, the audio server 166 is a functional operation of the media gateway MG2 or one of the other media gateways (e.g., media gateway MG4). The audio server 166 includes processing functionality 166a to combine the packet data (e.g., voice) from media gateways MG1, MG2, and MG4 provided through respective packet connections 168a, 170a, and 172.

The processing functionality 166a can combine the data from the various packet connections 168a, 170a, 172 through various well-known methods. In one example, the individual voice data packets can be converted to individual analog signals, the individual analog signals combined, and the combined analog signals converted back into one or more combined voice data packets. The combined voice data packets can then be provided to each of the media gateways MG1, MG2, and MG4 for the three-way call. It is noted that in the present example, the combined voice data packets provided to the media gateway MG1 is intermediately provided through the anchor media gateway MG2.

Figure 7:
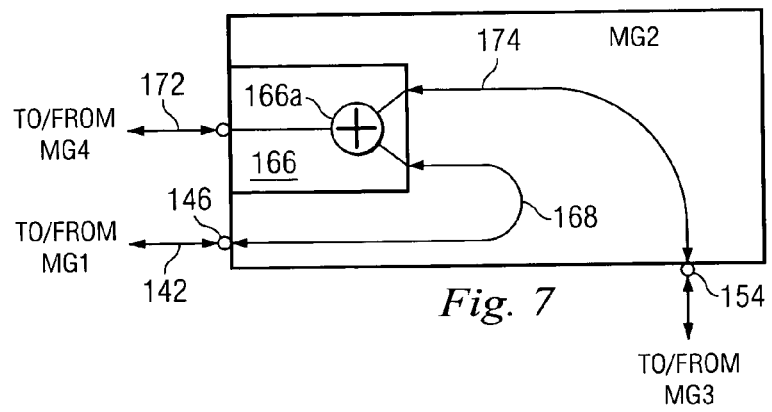

Referring now to FIG. 7, the media gateway MG2 can also facilitate additional call features when the media gateway MG2 has already handed off the call to another network node. In a modification to the example of FIGS. 5 and 6, the call has been handed off to the media gateway MG3 and a three-way call is desired with the other entity connected to media gateway MG4. In this example, instead of a packet connection between ports 146 and 154 (as discussed above with reference to FIG. 5), packet traffic from ports 146 and 154 are directed to the audio server 166 through packet connections 168 and 174, respectively.

In one embodiment, the audio server 166 is a part of the media gateway MG2, although functionally illustrated in FIG. 7 as being separate for the sake of clarity. The audio server 166 includes the processing functionality 166a to combine the packet data (e.g., voice) from media gateways MG1, MG3, and MG4 provided through respective packet connections 168, 174, and 172, as discussed above with reference to FIG. 6. The combined voice data packets can then be provided to each of the media gateways MG1, MG3, and MG4 for the three-way call. It is noted that in the present example, the combined voice data packets provided to the media gateways MG1 and MG3 are intermediately provided through the anchor media gateway MG2.

Figure 8:
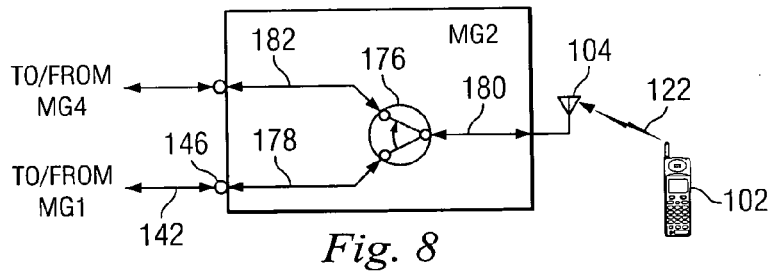

Referring now to FIG. 8, the media gateway MG2 can provide still more call handling features. For example, the mobile unit 102 (FIG. 5) is in communication with an entity connected through media gateway MG1 and is further in communications with another entity connected to media gateway MG4. In this example, the mobile unit 102 will only be connected to one of the entities at a time in a call-waiting service. In furtherance of the present example, the mobile unit 102 can selectively switch between the connections to the two entities.

The packet traffic from port 146 is directed to an audio server, in this case a packet "switch" 176, through packet connection 178. Likewise, packet traffic from the RAN 104 is directed to the packet switch 176 through packet connection 180 and packet traffic from the media gateway MG4 is directed to the packet switch through packet connection 182.

In one embodiment, the packet switch 176 is a software functional operation of the media gateway MG2 or one of the other media gateways (e.g., media gateway MG4). The packet switch 176 can switch between the packet connections 178, 180, 182 through various well-known methods. The packet switch 176 can include processing functionality to be responsive to control data and selectively provide packet data between a subset of the media gateways MG1, MG2, and MG4. In one example, routing information in the individual voice data packets can be modified to direct certain packets to the desired packet connection and letting the other packets be dropped, deleted or used elsewhere. In another embodiment, the packet switch 176 can be a node that is separated from the media gateways MG1, MG2, and MG4 through one or more external connections.

Figure 9:
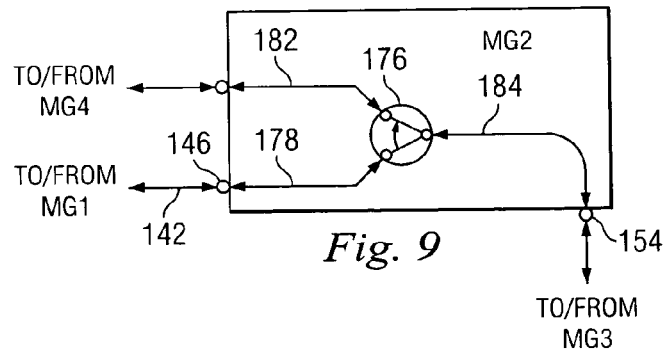

Referring now to FIG. 9, the media gateway MG2 can also facilitate call-waiting when the media gateway MG2 has already handed off the call to another network node. In a modification to the example of FIGS. 5 and 8, the call has been handed off to the target radio resource and a call-waiting service is desired with the other entity connected to media gateway MG4. In this example, instead of a packet connection between ports 146 and 154 (as discussed above with reference to FIG. 5), packet traffic from ports 146, 154 are directed to the packet switch 176 through packet connections 178, 184, respectively. As in FIG. 8, packet traffic from the media gateway MG4 is directed to the packet switch through packet connection 182.

The packet switch 176 can switch between the packet connections 178, 182, 184 through various well-known methods, such as those discussed above with reference to FIG. 8. The selected voice data packets can then be provided to the appropriate media gateways MG1, MG3, and/or MG4 for the call-waiting service. It is noted that in the present example, the voice data packets are intermediately provided through the anchor media gateway MG2 even though RAN 104 is not being used on the call.

Although only a few exemplary embodiments of this invention have been described in detail above, those skilled in the art will readily appreciate that many modifications are possible in the exemplary embodiments. For example, the audio server 166 and packet switch 176 can be a single adjunct module to the media gateway MG2 to thereby retrofit a conventional media gateway for performing the above-described embodiments. Also, either of the media gateways can be connected to a circuit-switched domain and the present invention can accommodate many different network configurations. Accordingly, all such modifications are intended to be included in the scope of this invention as defined in the following claims. In the claims, means-plus-function clauses are intended to cover the structures described herein as performing the recited function and not only structural equivalents, but also equivalent structures.

It is further understood that the number of media gateways, entities, and other nodes discussed in the present disclosure is reduced for the sake of clarity. The present invention can also apply to n-way calls and various combinations of n-way calls, call waiting services, and other call handling procedures.

What is claimed is:

1. A system for handling packet communications from three entities in a packet communications network, the system comprising:
   a media gateway having first and second ports for establishing first and second links to transfer packet communications to and from the first and second entities, respectively;
   first and second packet connections for interconnecting the first and second links, respectively, to an audio server;
   a third link for transferring packet communications to and from the third entity and the audio server;
   the audio server for manipulating the packet communications received from the first, second, and third entities and providing the manipulated packet communications to the first, second, and third entities.

2. The system of claim 1 wherein the manipulation performed by the audio server is combining the packet communications to provide an n-way call.

3. The system of claim 1 wherein the manipulation performed by the audio server is selectively routing the packet communications to provide a call-waiting service.

4. The system of claim 1 wherein the packet communications is a packet voice call.

5. The system of claim 1 wherein the first and second links are connected to separate and detached media gateways.

6. The system of claim 1 wherein the first link is a connection to a radio access network.

7. The system of claim 1 wherein the packet communications network is a Code Division Multiple Access (CDMA) network and the first entity is a cellular telephone connected to the system via a radio access network.

8. The system of claim 1 wherein the second link is connected to the second entity via a circuit-switched network.

9. The system of claim 1 wherein node is connected to a circuit-switched voice network.

10. The system of claim 1 wherein the audio server is a software routine.

11. The system of claim 1 wherein the audio server is a separate processing node of the network.

12. A media gateway comprising:
   first and second call ports for transmitting and receiving packet call information;
   a processor for performing instructions response to call-handling control information; and
   a memory for storing a plurality of instructions, wherein the instructions include:
      instructions, upon receipt of three-way call control information, for routing packet call information from the first and second call ports to an audio server; and
      instructions for directing the audio server to combine the packet call information from the first and second call ports with call information from a third entity.

13. The media gateway of claim 12 wherein the instructions further include:
   instructions for transmitting the combined packet call information to the first and second call ports.

14. The media gateway of claim 12 wherein the first and second call ports are connected to two different media gateways.

15. An anchor media gateway comprising:
   a control interface for receiving control information;
   first and second call ports for transmitting and receiving packet call information from first and second media gateways, respectively;
   a processor for performing instructions responsive to received control information; and
   a memory for storing a plurality of instructions, wherein the instructions include:
      instructions for routing packet call information between the first and second call ports;
      instructions, upon receipt of control information, for routing the packet call information to an audio server, the audio server further connected to a third media gateway for transmitting and receiving packet call information there from;
      instructions, upon receipt of the control information, for modifying at least a subset of the packet call information received by the audio server; and
      instructions, upon receipt of the control information, for routing the modified subset of the packet call information to the second media gateway.

16. The anchor media gateway of claim 15 wherein the instructions for modifying at least a subset of the packet call information is to selectively drop packet call information from the first media gateway.

17. The anchor media gateway of claim 15 wherein the instructions for modifying at least a subset of the packet call information is to selectively drop packet call information from the third media gateway.

18. The anchor media gateway of claim 15 wherein the instructions for modifying at least a subset of the packet call information is to combine all of the received packet call information from the three media gateways.

19. The anchor media gateway of claim 15 wherein the audio server is separated from the anchor media gateway, and wherein the third media gateway is not connected to the anchor media gateway.

20. A method for handling a request for a three-way call in a packet communications network, the method comprising:
   instructing an anchor media gateway, having first and second ports, to route voice packets between the first and second ports connected to first and second media gateways, respectively;
   instructing the anchor media gateway to route the voice packets to an audio server, upon receipt of the request for the three-way call;
   instructing the audio server to combine the voice packets with voice packets from a third media gateway; and
   instructing the anchor media gateway to route the combined voice packets to the first and second ports.

21. The method of claim 20 further comprising:
   instructing the anchor media gateway to perform a hard handoff to the second port connected to the second media gateway.

22. A method for handling a request for call-waiting in a packet communications network, the method comprising:
   instructing an anchor media gateway, having a first port and a second port, to route voice packets between the first port and the second port connected to a first media gateway and a second media gateway, respectively; and
   upon receipt of the request for call-waiting, instructing the anchor media gateway to route voice packets between the first port and a third port connected to a third media gateway.

23. The method of claim 22 further comprising:
   instructing the anchor media gateway to perform a hard handoff to the second port connected to the second media gateway.

* * * * *